(No Model.)
F. E. YOUNG.
TRACTION WHEEL.
No. 282,022. Patented July 24, 1883.
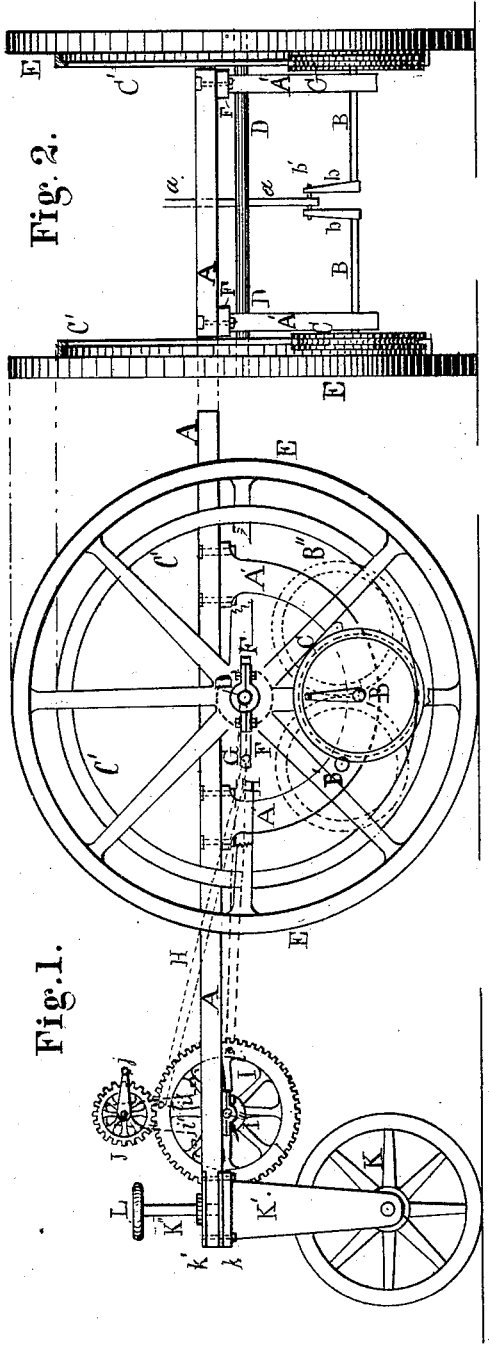
Witnesses
John Lockie
Geo. H. McNamee
Inventor
Franklin E. Young
Per Wm. R. Singleton
Atty.
N. PETERS, Photo-Lithographer, Washington, D. C.

UNITED STATES PATENT OFFICE.

FRANKLIN E. YOUNG, OF CANTON, OHIO.

TRACTION-WHEEL.

SPECIFICATION forming part of Letters Patent No. 282,022, dated July 24, 1883.

Application filed May 12, 1883. (No model.)

*To all whom it may concern:*

Be it known that I, FRANKLIN E. YOUNG, a citizen of the United States, residing at Canton, in the county of Stark and State of Ohio, have invented certain new and useful Improvements in Traction-Wheels, of which the following is a specification, reference being had therein to the accompanying drawings.

This invention relates to certain improvements in traction-wheels; and it consists in the employment of smaller driving-wheels placed upon circular rails within the tires of the larger wheels, which roll over the surface of the ground or track. The support of said larger wheels is so arranged that the small wheels may be adjusted either in front or in the rear of the axis of the larger wheels, whereby the load and weight of the vehicle can be made to propel it forward, or to retard it in descending steep grades, all of which will be hereinafter more fully described, and pointed out in the claim.

In the accompanying drawings, forming part of this specification, Figure 1 represents a longitudinal vertical view of the whole machine. Fig. 2 is an end view. Fig. 3 is a plan view, partly in section.

A is the bed or frame of a wagon, which is made to suit the purposes of the vehicle. When it is to be propelled by a steam-engine, it is to be made strong enough to bear the engine and boiler. This frame is designed to be supported by proper pedestals, or by curved segments A', in which are the bearings of the shaft B of the small driving-wheels C, which wheels are grooved to fit over the circular rails C', which are attached to the spokes inside of the larger wheels. The shaft B has on it a double crank, b, and wrist b', to which is attached the pitman a from the engine placed on the bed A.

D represents the shaft of the large wheels E E. This shaft has its end bearings in bolster-frames F F, which are connected by pivot-joints G to rods H, attached by wrists *i i* to the wheels I I', supported in proper standards, *i'*, at the front end, on the sides of the frame A. These wheels I I' are fixed on the same shaft I'', which is properly supported in the standards *i'*, or may be placed under the frame, as shown in Figs. 1 and 3.

I is a spur-gear, which meshes with a pinion-wheel, J, on which is a crank and handle, *j*, attached to its shaft inside and within convenient distance from the driver of the wagon.

K is a forward wheel at the end of the frame A, supported within the standard K', having its bearings in properly-constructed turning plates, *k k'*, underneath and above the frame A.

K'' is the spindle, and L the wheel for steering wheel K. The steering-wheel L and the crank-handle *j* are so placed relatively that the driver can steer the wagon with the left hand, and with his right hand operate the gears I and I', for the purpose of moving the bed A forward or backward, relative to the axis of the larger wheels E E, by means of the connecting-rods H H. When the wheels B B, by the turning of gears I I', are pulled forward, the weight of the wagon is thrown forward of the bearings of the larger wheels E E, as shown in broken lines at B'. The wheels B, being driven by the engine, will continue to roll forward up the rails C' C', which will cause larger wheels E E to roll forward also. To prevent the wagon from going downgrade too rapidly, the wheels B B can be carried behind the axis of D, as shown at B'', where the weight of the wagon will be thrown in the rear, having a tendency to retard the motion of wheels E E. To assist the driver in holding the wheels I I', a pawl is placed on the standard which supports wheel J to hold it in any position required.

As the bearings of shaft D will be greatly increased in friction by the operation of the device just described, the bearings of the shaft should be supplied with the anti-friction bushings.

The bed or frame A can be made to extend as far in the rear of the shaft D as it does in front. Then a similar wheel to K can be attached to that end, having an adjusting-spring above it to admit of the wheel running over irregular ground without lifting the bed. Springs may be used also over the front wheel, K, for the same purpose. This arrangement of bed-frame A relative to the shaft of the supporting-wheels E E can be used for animal-power by shafts or tongue in front in the usual method of drawing the vehicle when properly arranged; or it can be made for use as an ordinary push-cart.

I claim—

The combination of the driving-wheels C C with the larger wheels E E, supported in bearings F F, the connecting-rods H H, and gear-wheels I I' and J, whereby the wheels B B are adjusted relative to the wheels E E, substantially as and for the purpose described.

In testimony whereof I affix my signature in presence of two witnesses.

FRANKLIN E. YOUNG.

Witnesses:
 JOHN LOCKIE,
 L. C. YOUNG.